United States Patent [19]

Kurusu et al.

[11] Patent Number: 4,691,240

[45] Date of Patent: Sep. 1, 1987

[54] IMAGE INPUT DEVICE AND A METHOD OF CORRECTING INPUT SIGNALS OF THE SAME

[75] Inventors: Yasuo Kurusu, Kyoto; Yoshiaki Morizumi, Shiga, both of Japan

[73] Assignee: Dainippon Screen Mfg. Co., Ltd., Kyoto, Japan

[21] Appl. No.: 841,467

[22] Filed: Mar. 20, 1986

[30] Foreign Application Priority Data

Mar. 30, 1985 [JP] Japan .................................. 60-67866

[51] Int. Cl.$^4$ ............................................. H04N 1/40
[52] U.S. Cl. .................................... 358/282; 358/284; 382/50
[58] Field of Search ....................... 358/280, 282, 284; 382/50, 54

[56] References Cited

U.S. PATENT DOCUMENTS

| | | | |
|---|---|---|---|
| 4,520,395 | 5/1985 | Abe | 358/282 |
| 4,554,593 | 11/1985 | Fox et al. | 358/282 |
| 4,578,711 | 3/1986 | White et al. | 358/282 |
| 4,578,715 | 3/1986 | Yamaguchi | 358/282 |
| 4,589,034 | 5/1986 | Yokomizo | 358/282 |
| 4,601,058 | 7/1986 | Seto | 358/282 |

*Primary Examiner*—Edward L. Coles, Sr.
*Attorney, Agent, or Firm*—Lowe Price LeBlanc Becker & Shur

[57] ABSTRACT

Reference data for correction are obtained by performing main scanning of a reference plane by a photosensor in a defocusing manner through a lens system, to be stored in memories. Image data of the original read by the photosensor through the lens system are corrected through the reference data for correction stored in the memories. Thus, the original can be read in high fidelity.

12 Claims, 7 Drawing Figures

IMAGE INPUT DEVICE AND A METHOD OF CORRECTING INPUT SIGNALS OF THE SAME

BACKGROUND OF THE INVENTION

1. Field of the Invention

The present invention relates to an image input device and a method of correcting input signals of the same, and more particularly, it relates to an image input device employed in the field of process printing or the like, which is required to read the original in high fidelity and a method of correcting input signals of the said device.

2. Description of the Prior Art

In a conventional image input device for reading the original through a photosensor such as a photo diode array formed by a plurality of photo-electric conversion elements and CCD (charge coupled device), picture signals read by the photosensor are subjected to so-called shading correction to be supplied to an image processing device, so that the original is read in high fidelity. The shading correction is so perfomed as to prevent influences such as dispersion of difference in sensitivity between the respective elements specific to the photosensor, variation of dark currents and irregular illumination originating in an optical or illumination unit. Data required for such shading correction are stored in memory as reference data for correction in advance to reading of the original so that the shading correction is perfomed by adjusting the gain of the picture signals to be read on the basis of the said reference data for correction.

The aforementioned reference data for correction have generally been fetched in the memory through use of the photosensor for reading the original with a white reference panel located on its focal position thereby to perform main scanning for one scanning line.

In such a method, however, foreign matters such as black spots and dust sticking on the main scanning lines of the white reference panel may be so clearly resolved that false information is fetched as the reference data for correction. Further, when the surface of the reference panel is slightly irregular, the direction of reflection or transmission of light may be changed to some extent depending on the position of scanning to change the amount of incident light, and hence, also in this case, false information is fetched as the reference data for correction. The shading correction cannot be precisely perfomed with such false reference data, whereby the orignal cannot be read in high fidelity.

SUMMARY OF THE INVENTION

The present invention is directed to an image input device which corrects picture signals formed by reading the original by a photosensor through a lens system by reference data to supply the same to an image processing device, and a method of correcting input signals of the said image input device.

The image input device according to the present invention comprises memory means, a reference plane evenly finished in density, a photosensor formed by an array of a plurality of photoelectric conversion elements, a lens system for selectively converging the image of either the original or the said reference plane on the photoelectric conversion elements of the said photosensor, switching means for selectively switching the object of image formation of the lens system to either the said original or the said reference plane, reference data fetch means for performing main scanning of the said reference plane at least once by the said photosensor in a defocusing manner while switching the object of image formation of the said lens system to the said reference plane by the said switching means thereby to obtain reference data for correction, means for storing the said reference data for correction in the said memory means and correction means for reading picture signals from the said original by the said photosensor in a time-series manner while switching the object of image formation of the said lens system to the said original by the said switching means thereby to correct the said picture signals through the reference data for correction stored in the said memory means.

The method of correcting input signals of an image input device according to the present invention comprises, in combination with an image input device comprising memory means, a reference plane evenly finished in density, a photosensor formed by an array of a plurality of photoelectric conversion elements and a lens system for selectively converging the image of either the said reference plane or the original on the photoelectric conversion elements of the said photosensor, a first switching step of switching the object of image formation of the said lens system to the said reference plane, a reference data fetching step of performing main scanning of the said reference plane through the said lens system at least once in a defocusing manner to obtain reference data for correction, a storage step of storing the said reference data for correction in the said memory means, a second switching step of switching the object of image formation of the said lens system to the said original and a correction step of reading picture signals from the said original by the photosensor through the said lens system in a time-series manner thereby to correct the picture signals through the reference data for correction stored in the said memory means.

Accordingly, the principal object of the present invention is to provide an image input device which can fetch reference data for correction in high definition thereby to read the original in high fidelity and a method of correcting input signals in the said image input device.

According to the present invention, the reference data for correction are obtained by performing main scanning of the reference plane which is even in density at least once in a defocusing manner. Therefore, even if foreign matters stick on the reference plane or the surface of the reference plane is slightly irregular, substantially no influence is exerted on the reference data for correction, which are fetched in high accuracy to correct the picture signals from the original, thereby to facilitate the operation for reading the original in high fidelity.

These and other objects, features, aspects and advantages of the present invention will become more apparent from the following detailed description of the present invention when taken in conjunction with the accompanying drawings.

DESCRIPTION OF THE PREFERRED EMBODIMENTS

In order to facilitate easy understanding of the present invention, detailed description is now made on shading correction.

As well known in the art, the photoelectric conversion characteristics of respective elements of a photosensor such as a photo diode array or CCD are in the following relation:

$$V_i = S_i X_i + D_i \qquad (1)$$

where $V_i$ represents the sensor output voltage, $S_i$ represents the conversion efficiency, $X_i$ represents the amount of incident light and $D_i$ represents the dark output voltage.

Figure 3:
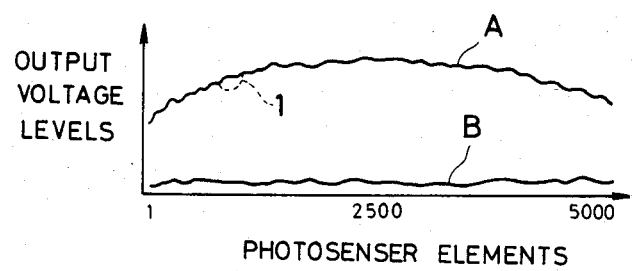
FIG. 3 illustrates the output characteristics of a photosensor employed in the image input device according to the present invention.

It is well known that dispersion of the conversion efficiency $S_i$ between respective elements is about 10%, while dispersion of the output voltage $V_i$ including shading through a lens system etc. is about 30 to 50%. The dark output voltage $D_i$ is about 1% of the sensor output voltage $V_i$, and dispersion thereof is about 10%. Such output characteristics are shown in FIG. 3, in which the abscissa indicates the respective elements arrayed along the main scanning direction of the photosensor and the ordinate indicates the output voltage levels of the elements. A characteristic curve A in FIG. 3 shows an example of the output voltage characteristics of the photosensor obtained by illuminating a white level reference image (e.g., white reference panel) having uniform reflectivity or transmissivity and performing main scanning of the same, while a characteristic curve B shows an example of the output voltage characteristics of the photosensor obtained by main scanning with the said illumination being turned off.

Assuming that $V_{wi}$ represents the output voltage of an i-th element of a multielement photosensor obtained by main scanning of the white level reference image with illumination, the output voltage $V_{wi}$ is obtained in the following manner, with respect to the amount $X_{wi}$ of incident light:

$$V_{wi} = S_i X_{wi} + D_i \qquad (2)$$

Further, assuming that $V_{Bi}$ represents the output voltage of the i-th element of the multielement photosensor obtained by main scanning with no illumination, the output voltage $V_{Bi}$ coincides with the dark output current $D_i$ as follows, since the amount of incident light is zero:

$$V_{Bi} = D_i \qquad (3)$$

The amount $X_{Ri}$ of incident light for reading the original can be regarded as obtained by modulation (in modulation coefficient $k_i$) of the amount $X_{wi}$ of light upon input of the white reference image from the original, and hence the output voltage $V_{Ri}$ per element of the multielement photosensor in the above expression (1) is as follows:

$$V_{Ri} = S_i \cdot X_{Ri} + D_i \qquad (4)$$
$$= S_i \cdot K_i X_{wi} + D_i$$

where $K_i$ represents the modulation coefficient in reflectivity or transmissivity at the i-th element through the original, and satisfies $0 \leq K_i \leq 1$.

The value $K_i$ is obtained through the expressions (2), (3) and (4) as follows:

$$K_i = \frac{V_{Ri} - D_i}{S_i X_{wi}} \qquad (5)$$
$$= \frac{V_{Ri} - D_i}{V_{wi} - D_i}$$
$$= \frac{V_{Ri} - V_{Bi}}{V_{wi} - V_{Bi}}$$

The shading correction is performed by calculating the above expression (5). In other words, the expression (5) is operated through the reference signals $V_{wi}$ and $V_{Bi}$ with respect to a picture signal $V_{Ri}$, whereby outputted after the operation processing (correction) is a picture signal proportionate only to the modulation coefficient $k_i$ and influences by difference in sensitivity of the multi-element photosensor, dark currents, illumination, optical system etc. are corrected so that the obtained picture signal is determined only by density (reflectivity or transmissivity) of the original.

Figure 4:
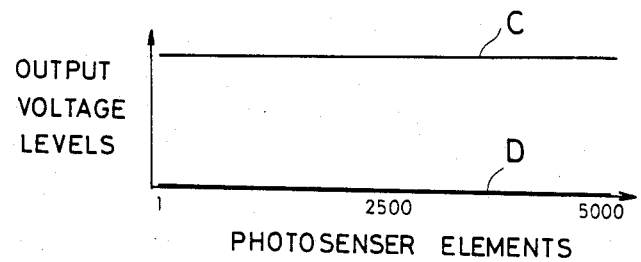
FIG. 4 illustrates the output characteristics after shading correction of picture signals obtained by main scanning of a reference plane.

FIG. 4 illustrates output voltage characteristics after shading correction, in which a characteristic curve C shows the output voltage characteristics obtained by shading correction of a picture signal (corresponding to the characteristic curve A in FIG. 3) on the white level reference plane and a characteristic curve D shows the output voltage characteristics obtained by shading correction of a picture signal (corresponding to the characteristic curve B in FIG. 3) on the reference plane in a dark state. Both of the characteristic curves C and D are representative of output characteristics of constant voltage.

In order to perform shading correction in high definition, it is necessary to accurately fetch reference data for correction (corresponding to $V_{wi}$ and $V_{Bi}$ in expression (5)) as obvious from the above expression (5). When the reference data are fetched with the focus being on the white level reference plane as in the conventional case, however, foreign matters such as black spots and dust sticking on the scanning lines of the white level reference plane may be represented by false signals 1 as shown in FIG. 3, which are fetched as false reference data. Further, when the surface of the reference plane is slightly irregular, the direction of reflection or transmission of light varies with the position of scanning to cause change in the amount of incident light, whereby false information is fetched as the reference data. Consequently, shading correction through the said reference data leads to inaccurate correction of the picture signals by the false data based on the said foreign matters and irregularity of the reference plane, whereby the original cannot be read in high fidelity.

According to the present invention, therefore, the reference data are fetched by performing main scanning in defocusing state, so as to correctly fetch the same even if foreign matters stick on the reference plane or the surface of the reference plane is slightly irregular. Thus, the wite level reference plane is scanned in constant width in the so-called out-of-focus state, whereby data at the center of scanning as well as those around the same are simultaneously fetched to obtain levelled data. Therefore, even if foreign matters stick on the scanning lines of the white level reference plane, data in white regions around the said foreign matters are simultaneously fetched with those of the foreign matters to be levelled therewith, and hence influences by the foreign matters are reduced to obtain reference data in high definition. In the case where the reference plane is slightly irregular such that respective points on the reference plane are somewhat different in the direction of reflection or transmission of light from each other, further, a levelled amount of incident light can be obtained by performing main scanning in a defocusing state, thereby to reduce influences by irregularity of the reference plane and obtain white reference data in high accuracy.

Figure 1:
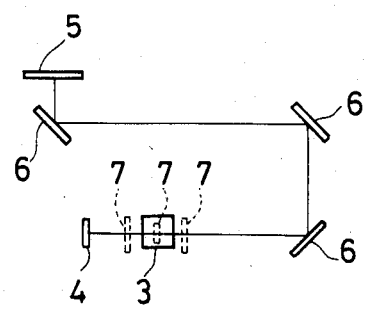
FIG. 1 illustrates an example of a method of defocusing an image input device according to an embodiment of the present invention.

FIG. 1 is a diagram showing a method of defocusing an image input device for fetching reference data. As shown in FIG. 1, the image input device according to the present invention comprises an objective lens system 3, a photosensor 4 located on one focus thereof and a white reference panel 5 located on the other focus so that the image on the white reference panel 5 is reflected by mirrors 6 and converged through the objective lens system 3 to be formed on the photosensor 4. In this case, main scanning is performed in a perpendicular manner with respect to FIG. 1. In the device as shown in FIG. 1, a member 7 for changing the optical path length is formed by a glass plate etc. to be inserted in the optical path defined through the white reference panel 5, the mirrors 6 and the objective lens system 3, so as to locate the white reference panel 5 in a non-focal position as the result. In practice, the optical path length changing member 7 may be inserted, e.g., in front or back of the objective lens system 3 or the interior thereof, since the objective lens syste, 3 is generally formed by combined lenses. In place of the said optical path length changing member 7, at least one of the white reference panel 5, the objective lens system 3 and the photosensor 4 may be moved along the optical path thereby to shift the focal position.

Figure 2:
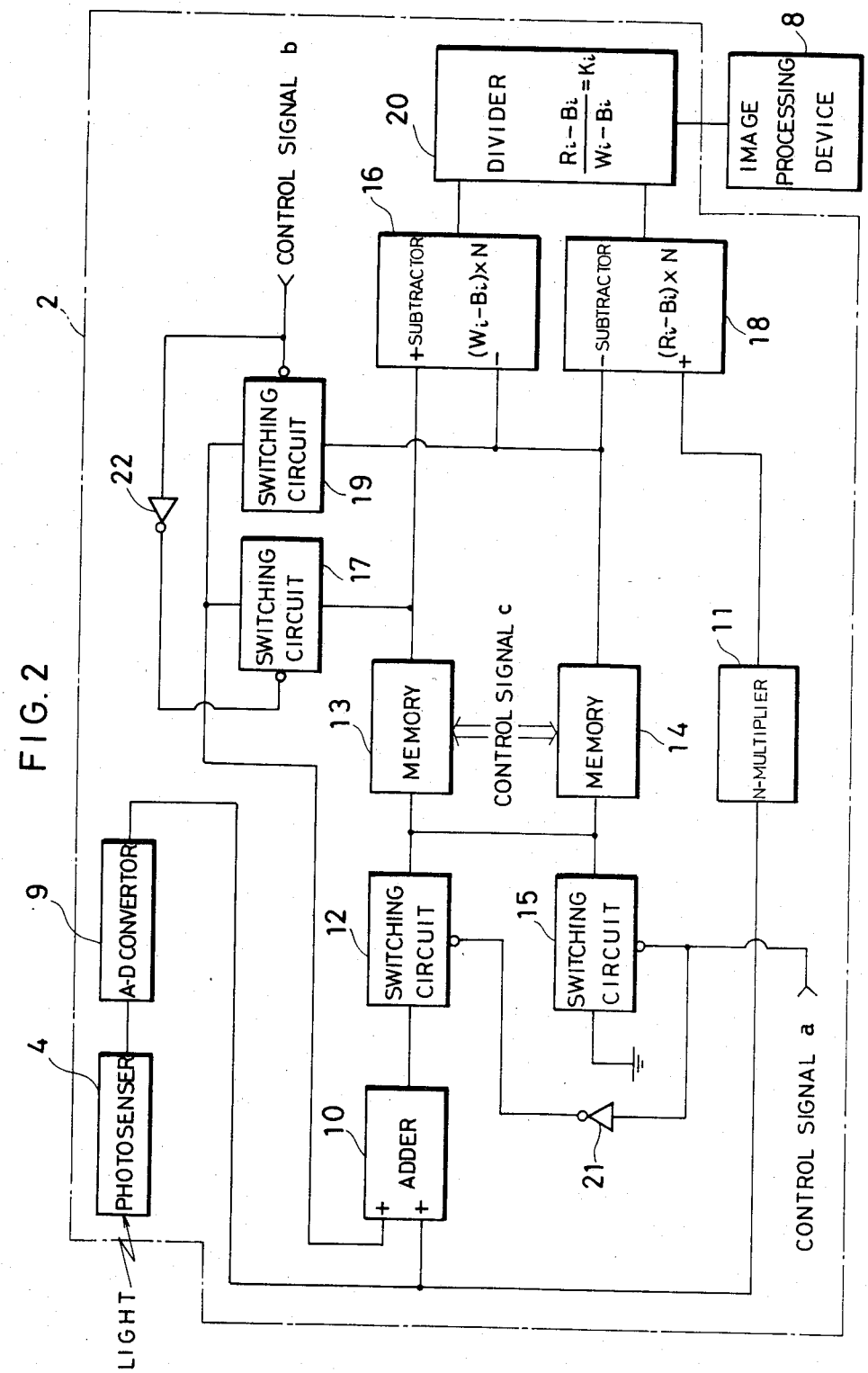
FIG. 2 is circuit diagram showing the image input device according to the present invention.

FIG. 2 is a circuit diagram showing an example of the image input device according to the embodiment. The image input device 2 is adapted to perform shading correction of picture signals read by the photosensor 4, thereby to supply the same to an image processing device 8, as hereinafter described. Although the circuit of this embodiment is so structured as to fetch reference data by performing main scanning by N times (N: integer not less than one), the number of main scanning times is not particularly restricted.

In more detail, the output terminal of the photosensor 4 is connected to one input terminal of an adder 10 and the input terminal of an N-multiplier 11 through an A-D converter 9. The output terminal of the adder 10 is connected to the input terminals of a white reference data memory 13 and a black reference data memory 14 through a switching circuit 12. The respective input terminals of the white and black reference data memories 13 and 14 are so connected as to receive grounded signals through another switching circuit 15. The said switching circuits 12 and 15 are adapted to selectively electrify either the white reference data memory 13 or the black reference data memory 14 in response to a memory input control signal a, as herein-after described in detail.

The output terminal of the white reference data memory 13 is connected to the plus input terminal of subtracter 16, as well as to the other input terminal of the adder 10 through a switching circuit 17. On the other hand, the output terminal of the black reference data memory 14 is connected to the minus input terminals of the subtracters 16 and 18. Either the switching circuit 17 or 19 is selectively electrified in response to an adder input control signal b, as hereinafter described in detail.

The output terminal of the N-multiplier 11 is connected to the plus input terminal of the subtracter 18. The subtracter 16 is adapted to operate difference between the white and black reference data received from the white and black reference data memories 13 and 14, to supply the same to one input terminal of a divider 20. The subtracter 18 is adapted to operate difference between the image data received from the N-multiplier 11 and the black refernce data received from the black reference data memory 14, to supply the same to the other input terminal of the divider 20. The divider 20 divides the data received from the subtracter 18 by those received from the subtracter 16 to perform shading correction, thereby to output corrected picture signals to the image processing device 8.

Figure 6:
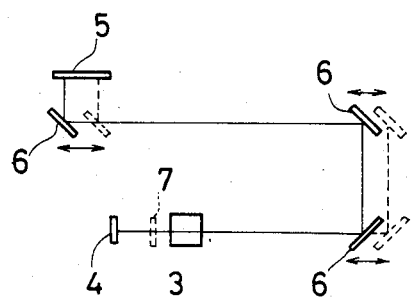
FIG. 6 is a diagram for illustrating a method of relatively changing the position of main scanning by the photosensor in the feed direction.
Figure 7:
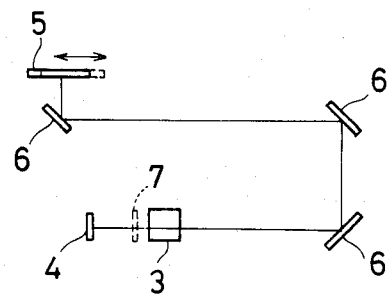
FIG. 7 is a diagram for illustrating another example of the method of relatively changing the position of main scanning by the photosensor in the feed direction.

In order to fetch the reference data, main scanning of the reference plane is performed N times with the position of scanning relatively changed in the feed direction, and position of main scanning may be shifted in the feed direction by the following methods in practice: In a first method as shown in FIG. 6, the mirrors 6 are moved along the feed direction, i.e., transversely in FIG. 6. In a second method as shown in FIG. 7, the mirrors 6 are fixed and the reference panel 5 is moved along the feed direction, i.e., transversely in FIG. 7. It is to be noted that main scanning of the reference plane may be performed N times with the position of scanning relatively changed along the main scanning direction or along both of the main scanning and feed directions.

The image input device according to the present invention is further provided with a switching mechanism for selectively switching the object of image formation of the lens system 3 to either the reference plane or the original.

Description is now made on the aforementioned image input device according to the present invention.

(A) Fetch of Reference Data (a) Memory Clear

The white and black reference data memories 13 and 14 are cleared in advance to fetch of the reference data. In procedure, a "low" signal is supplied as the memory input control signal a to set the switching circuit 15 in an electrified state, while the "low" signal is simultaneously inverted by an inverter 21 to a "high" signal to be supplied to the other switching circuit 12, thereby to set the same in a floating state. Thus, the ground potential, i.e., a zero signal is inputted in the input terminals of both of the memories 13 and 14 through the switching circuit 15. Then a memory control signal c supplies clear commands for clearing the data stored in storage regions of the white and black reference data memories 13 and 14 corresponding to the respective elements.

(b) Setup Operation for Fetching White or Black Reference Data

After the white and black reference data memories 13 and 14 are cleared, setup operation is performed in order to store data in the white and black reference data memories 13 and 14 by supplying a "high" signal as the memory input control signal a to set the switching circuit 15 in a floating state while simultaneously inverting the said "high" signal by the inverter 21 to a "low" signal, which is supplied to the other switching circuit 12 to set the same in an electrified state. Thus, the output terminal of the adder 10 is made to communicate with the white and black reference data memories 13 and 14 through the switching circuit 12.

(c) Fetch of White Reference Data

Then white reference data for shading correction are fetched in the white reference data memory 13. In procedure, a "high" signal is supplied as the adder input control signal b, which is inverted by an inverter 22 to a "low" signal to be supplied to the switching circuit 17, thereby to set the same in an electrified state. At this time, the other switchig circuit 19 is set in a floating state since the "high" signal is supplied as the adder input control signal b. Thus, the output terminal of the white reference data memory 13 is made to communicate with the one input terminal of the adder 10 through the switching circuit 17.

Figure 5:
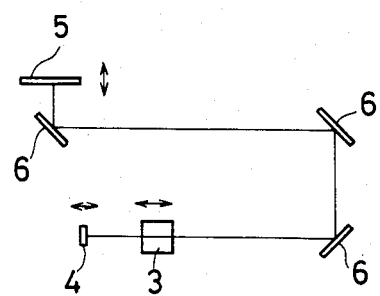
FIG. 5 illustrates another example of method of defocusing the image input device according to the present invention.

Then an illumination unit assembled in the image input device 2 illuminates the white reference panel 5, thereby to select the same as the object of image formation of the lens system 3. Further, the white reference panel 5 is located in a non-focal position by the method as hereinabove described with reference to FIG. 1 or 5. In this state, the white reference panel 5 is subjected to main scanning for one scanning line by the photosensor 4. In response to the main scanning operation, the A-D converter 9 converts analog pictrue signals sequentially outputted from the respective elements of the photosensor 4 into digital picture signals, which are supplied to one input terminal of the adder 10. Every time the said one terminal of the adder 10 receives the said digital picture signal, data stored in the corresponding storage region is read from the white reference data memory 13 in synchronization with the main scanning operation to be supplied to the other input terminal of the adder 10, which in turn adds up the both data thereby to updatingly store the data thus obtained in the original storage region of the white reference data memory 13.

Upon completion of the data fetch operation by the first main scanning operation by the photosensor 4, the main scanning position is shifted in the feed direction by method as hereinabove described with reference to FIG. 6 or 7. Also in this case, the adder 10 adds up image data obtained by the main scanning operation and the corresponding image data stored in the white reference data memory 13 in synchronization with the main scanning operation by the photosensor 4, thereby to updatingly store the data thus obtained in the original storage region of the white reference data memory 13. In the case where the main scanning operation is further pereformed three or more times, the main scanning position is further relatively changed in the feed direction in a similar manner to the above to perform respective main scanning operation such that image data obtained per main scanning operation is added up with corresponding image data stored in the white reference memory 13, to be updatingly stored in the same. Thus, the white reference data for correction are fetched in the white reference data memory 13 by main scanning operation by the prescribed number of times (i.e., N times).

(d) Fetch of Black Reference Data

After the white refernce data are completely fetched, black reference data are fetched in the black reference data memory 14. In procedure, a "low" signal is supplied as the adder input control signal b to set the switching circuit 19 in electrified state, thereby to make the output terminal of the black reference data memory 14 communicate with the other input terminal of the adder 10 through the switching circuit 19. At this time, the other switching circuit 17 is set in a floating state since the "low" signal serving as the adder input control signal b is inverted by the inverter 22 to a "high" signal to be supplied to the same.

Then the reference plane of white reference panel 5 is changed to that of the black level. In this state, the first main scanning operation is perfomed on the black level reference plane through the photosensor 4, thereby to convert analog picture signals sequentially outputted from the respective elements of the photosensor 4 into digital signals by the A-D converter 9, to supply the same to one input terminal of the adder 10. Every time the said one input terminal of the adder 10 receives the digital picture signal, the data stored in the corresponding region is read from the black reference data memory 14 in synchronization with the main scanning operetion by the photosensor 4 to be supplied to the other input terminal of the adder 10, which in turn adds up the both data to updatingly store the data thus obtained in the original storage region of the black reference data memory 14, in a similar manner to the operation for fetching the white reference data. Such main scanning operation is performed N times in the same scanning position so as to add up the image data and the corresponding image data stored in the black reference data memory 14 every time the image data is obtained by the respective main scanning operation, thereby to updatingly store the data thus obtained in the original storage region of the black refernce data memory 14 for shading correction.

Although the black reference data are fetched after the white reference data, the fetch operation is not restricted to the said order, but may be performed in a reverse manner.

(B) Original Reading

The original is read subsequent to the aforementioned reference data fetch operation. In procedure, the object of image formation of the lens system 3 is switched from the white reference panel 5 to the original through the switching mechanism assembled in the image input device 2. Then the original is brought into the focus to be scanned through the photosensor 4 by a well-known method. When the first scanning operation for one scanning line is performed by the photosensor 4, the A-D converter 9 converts analog picture signals seqentially outputted from the respective elements into digital picture signals to supply the same to the N-multiplier 11, which in turn multipiies the same by N and outputs the results to the plus input terminal of the subtracter 18. Every time an N-multiplied image data $[R_i \times N]$ is supplied to the subtracter 18, corresponding black reference data $[B_i \times N]$ is read from the black reference data memory 14 in synchronization with the main scanning operation by the photosensor 4 to be supplied to the minus input terminal of the subtracter 18, which in turn operates difference between the N-multiplied image data $[R_i \times N]$ and the black reference data $[B_i \times N]$, thereby to supply the diffrence data $[(R_i - B_i) \times N]$ to the one input terminal of the divider 20. On the other hand, every time the N-multiplied image data $[R_i \times N]$ is received in the subtracter 18, corresponding white reference data $[W_i \times N]$ and black refernce data $[B_i \times N]$ are read from the white and black refernce data memories 13 and 14 similarly in synchronization with the said main scanning operation by said photosensor 4 to supplied to the subtractor 16, which in turn operates difference between the white reference data $[W_i \times N]$ and the black reference data $[B_i \times N]$, thereby to supply the difference data $[(W_i - B_i) \times N]$ to the other input terminal of the divider 20.

The divider 20 divides the difference data $[(R_i - B_i) \times N]$ received from the subtracter 18 by the difference data $[(W_i - B_i) \times N]$ received from the subtracter 16 thereby to supply data $(R_i - B_i)/(W_i - B_i)$ thus obtained to the image processing device 8 as shading-corrected signals $k_i$. Such operation is repeated every time the original is read in response to the main scanning operation by the photosensor 4, thereby to sequentially supply the shading-corrected signals $K_i$ to the image processing device 8.

The N-multiplier 11 may be omitted by multiplying the white reference data received in the subtracters 16 and 18 by 1/N. Further, instead of employing the black level reference plane, the illumination unit may be turned off. In this case, correction may be performed in the same manner whether the signals employed are obtained through use of the black reference plane or by turning off the illumination unit.

According to the present invention as hereinabove described, main scanning of the white level reference plane is performed in a defocusing manner by the photosensor 4 to fetch the white reference data. Therefore, even if foreign matters such as black spots and dust stick on the main scanning lines of the white reference plane, not only the data on the foreign matters but data on white regions around the same are simultaneously fetched to obtain levelled data, whereby influences by the foreign matters are reduced to obtain white reference data in high definition. Further, even if the surface of reference plane is slightly irregular such that respective points thereof are different in the direction of reflection or transmittance of light, a levelled amount of incident light can be obtained by performing main scanning in defocusing manner, whereby the influence by the irregular reference plane is reduced to obtain the white reference data in high accuracy.

Thus obtaint are highly accurate reference data, and in consequence, the original can be read in high fidelity by correcting the picture signals on a the same by the accurate reference data. Further, as hereinabove described with reference to the embodiment, the main scanning operetion of reference plane is performed a plurality of times while relatively changing the scanning position in the feed or main scanning direction or in both directions in order to fetch the reference data, to further reduce influences by false data fetched in the reference data by foreign matters sticking on the reference plane and electric disturbance, thereby to obtain further accurate reference data and facilitate reading of the original in high fidelity.

Although the present invention has been described and illustrated in detail, it is clearly understood that the same is by way of illustration and example only and is not to be taken by way of limitation, the spirit and scope of the present invention being limited only by terms of the appended claims.

What is claimed is:

1. An image input device for correcting picture signals received in a time-series manner from an original to input said signals in an image processing device, said image input device comprising:
   memory means;
   a reference plane evenly finished in density;
   a photosensor formed by an array of a plurality of photoelectric conversion elements;
   a lens system for selectively converging the image of either said original or said reference plane on said photoelectric conversion elements of said photosensor;
   switching means for selectively switching the object of image formation of said lens system to either said original or said reference plane;
   reference data fetch means for performing main scanning of said reference plane at least once by said photosensor in a defocusing manner while switching the object of image formation of said lens system to said reference plane by said switching means to obtain reference data for correction;
   means for storing said reference data for correction in said memory means; and
   correction means for reading said picture signals from said original by said photosensor in a time-series manner while switching the object of image formation of said lens system by said switching means thereby to correct said picture signals through said reference data for correction stored in said memory means.

2. An image input device in accordance with claim 1, wherein
   said reference data fetch means performs said main scanning of said reference plane by said photosensor a plurality of times while relatively moving the position of scanning in at least either the feed direction or the main scanning direction to add up every image data obtained by said main scanning with image data stored in said memory means and restore the data thus obtained in said memory means thereby to produce said reference data for correction.

3. An image input device in accordance with claim 1, wherein
   said reference data fetch means inserts a member for changing optical path length in the optical path defined through said reference plane, said lens system and said photosensor thereby to cause defocusing.

4. An image input device in accordance with claim 3, wherein
   said member for changing optical path length is formed by a glass plate.

5. An image input device in accordance with claim 1, wherein
   said reference data fetch means moves at least one of said reference plane, said lens system and said photosensor in the optical path direction thereby to cause defocusing.

6. An image input device in accordance with claim 1, wherein said reference plane includes:

a white reference plane; and
a black reference plane,
said reference data for correction include:
said reference data obtained by performing main scanning of said white reference plane by said photosensor; and
black reference data obtained by performing main scanning of said black reference plane by said photosensor,
said memory means includes:
a first memory for storing said white reference data; and
a second memory for storing said black reference data, and
said correction means includes:
a first subtracter for obtaining difference between said white reference data stored in said first memory and said black reference data stored in said second memory;
a second subtracter for obtaining difference between image data from said original and said black reference data stored in said second memory; and
a divider for dividing output data of said second subtracter by output data of said first subtracter.

7. An image input device in accordanece with claim 6, wherein
said white reference plane is obtained by illuminating a white reference panel, and
said black reference plane is obtained by turning off the illumination on said white reference panel.

8. A method of correcting input signals of an image input device which comprises memory means, a reference plane evenly finished in density, a photosensor formed by an array of a plurality of photoelectric conversion elements and a lens system for selectively converging an image of either said reference plane or an original on said photoelectric conversion elements of said photosensor, said method comprising:
a first switching step of switching an object of image formation of said lens system to said reference plane;
a reference data fetching step of performing main scanning of said reference plane at least once by said photosensor through said lens system in a defocusing manner to obtain reference data for correction;
storage step of storing said reference data for correction in said memory means;
a second switching step of switching the object of image formation of said lens system to said original; and
a correction step of reading picture signals from said orignal through said lens system in a time-series manner by said photosensor, thereby to correct said picture signals through said reference data for correction stored in said memory means.

9. A method of correcting input signals of an image input device in accordance with claim 8, wherein
said memory means includes a first memory and a second memory, and
said reference plane includes a white reference plane and a black reference plane.

10. A method of correcting input signals of an image input device in accordance with claim 8, wherein said reference data fetching step includes:
a step of performing main scanning of said white reference plane by said photosensor to obtain white reference data; and
a step of performing main scanning of said black reference plane by said photosensor to obtain black reference data.

11. A method of correcting input signals of an input device in accordance with claim 8, wherein said storage step includes:
a step of storing said white reference data in said first memory; and
a step of storing said black reference data in said second memory.

12. A method of correcting input signals of an image input device in accordance with claim 8, wherein said correction step includes:
a first subtraction step of obtaining a first difference between said white reference data stored in said first memory and said black reference data stored in said second memory;
a second subtraction step of obtaining a second difference between the image data of said original and said black reference data stored in said second memory; and
a division step of dividing said second difference by said first difference.

* * * * *